United States Patent
Fries et al.

(10) Patent No.: US 9,561,563 B2
(45) Date of Patent: Feb. 7, 2017

(54) METHOD FOR PRODUCING A HEAT EXCHANGER FOR A MOTOR VEHICLE AND A HEAT EXCHANGER FOR A MOTOR VEHICLE

(71) Applicant: AUDI AG, Ingolstadt (DE)

(72) Inventors: Benedikt Fries, Geisenfeld (DE); Axel Löffler, Hohenwart (DE)

(73) Assignee: AUDI AG, Ingolstadt (DE)

( * ) Notice: Subject to any disclaimer, the term of this patent is extended or adjusted under 35 U.S.C. 154(b) by 487 days.

(21) Appl. No.: 14/061,102

(22) Filed: Oct. 23, 2013

(65) Prior Publication Data

US 2014/0110091 A1    Apr. 24, 2014

(30) Foreign Application Priority Data

Oct. 24, 2012   (DE) ................. 10 2012 020 882

(51) Int. Cl.
| | |
|---|---|
| *B23P 15/26* | (2006.01) |
| *F28F 1/00* | (2006.01) |
| *F28F 9/013* | (2006.01) |
| *F28F 9/02* | (2006.01) |
| *F28D 1/053* | (2006.01) |

(52) U.S. Cl.
CPC .......... *B23P 15/26* (2013.01); *F28D 1/05383* (2013.01); *F28F 1/00* (2013.01); *F28F 9/0131* (2013.01); *F28F 9/02* (2013.01); *F28F 2255/10* (2013.01); *F28F 2255/143* (2013.01); *F28F 2255/16* (2013.01); *F28F 2260/02* (2013.01); *Y10T 29/4935* (2015.01)

(58) Field of Classification Search
CPC .............. B23P 15/26; Y10T 29/4935; Y10T 29/49373; Y10T 29/49375; Y10T 29/49389; Y10T 29/49391; F28F 2255/16; F28D 1/05383
See application file for complete search history.

(56) References Cited

U.S. PATENT DOCUMENTS

| | | | | |
|---|---|---|---|---|
| 5,133,492 A | * | 7/1992 | Wohrstein | ............ B23D 31/002 225/101 |
| 5,407,116 A | * | 4/1995 | Nishishita | ............ B23D 21/00 225/101 |
| 5,544,698 A | * | 8/1996 | Paulman | ............ B23K 1/0012 165/133 |
| 5,772,104 A | * | 6/1998 | Paulman | ............ B23K 35/0222 228/175 |
| 5,931,075 A | * | 8/1999 | Yamaguchi | ............ B23D 21/00 74/45 |

(Continued)

FOREIGN PATENT DOCUMENTS

| | | |
|---|---|---|
| DE | 102011111091 A1 | 3/2012 |
| JP | 2006313054 | 11/2006 |
| WO | WO2010/141123 A2 | 12/2010 |

*Primary Examiner* — Jason L Vaughan
(74) *Attorney, Agent, or Firm* — Henry M. Feiereisen LLC

(57) ABSTRACT

A method for producing a heat exchanger for a motor vehicle, wherein the heat exchanger has reservoirs and a bundle of flow-through fluid conduits for guiding the flow between the reservoirs. The conduits are produced together as a bundle. A heat exchanger for a motor vehicle, especially a micro-channel cooler, can be produced by this method.

9 Claims, 5 Drawing Sheets

(56) References Cited

U.S. PATENT DOCUMENTS

| | | | |
|---|---|---|---|
| 6,462,949 B1* | 10/2002 | Parish, IV | F28D 15/0266 165/80.4 |
| 6,536,255 B2* | 3/2003 | Kraft | F28D 1/05383 165/177 |
| 6,935,409 B1* | 8/2005 | Parish, IV | F28D 1/0246 165/104.21 |
| 7,147,045 B2* | 12/2006 | Quisenberry | F28D 15/0233 165/104.26 |
| 7,150,312 B2* | 12/2006 | Parish, IV | F28D 15/0233 165/104.21 |
| 7,305,843 B2* | 12/2007 | Quisenberry | F28D 15/0233 165/104.21 |
| 7,448,441 B2* | 11/2008 | Hendricks | F28D 1/0246 165/181 |
| 7,857,037 B2* | 12/2010 | Parish | F28D 15/0233 165/104.21 |
| 7,967,061 B2* | 6/2011 | Gorbounov | F25B 39/028 165/174 |
| 8,333,013 B2* | 12/2012 | Shah | B23P 15/26 29/890.03 |
| 9,151,540 B2* | 10/2015 | Matter, III | B21C 37/151 |
| 2005/0077035 A1* | 4/2005 | Lamich | F28D 1/0535 165/175 |
| 2008/0149299 A1* | 6/2008 | Slaughter | B22F 3/1055 165/10 |
| 2009/0218070 A1* | 9/2009 | Fries | F28D 1/05366 165/41 |
| 2011/0203777 A1* | 8/2011 | Zhao | F28D 15/046 165/104.26 |
| 2011/0315364 A1* | 12/2011 | Matter, III | B21C 37/151 165/177 |
| 2012/0031601 A1* | 2/2012 | Matter, III | F28D 1/05383 165/177 |
| 2012/0053895 A1 | 3/2012 | Amir et al. | |

* cited by examiner

METHOD FOR PRODUCING A HEAT EXCHANGER FOR A MOTOR VEHICLE AND A HEAT EXCHANGER FOR A MOTOR VEHICLE

CROSS-REFERENCES TO RELATED APPLICATIONS

This application claims the priority of German Patent Application, Serial No. 10 2012 020 882.0, filed Oct. 24, 2012, pursuant to 35 U.S.C. 119(a)-(d), the content of which is incorporated herein by reference in its entirety as if fully set forth herein.

BACKGROUND OF THE INVENTION

The present invention relates to a method for producing a heat exchanger for a motor vehicle, the heat exchanger having reservoirs and a bundle of flow-through fluid conduits for guiding a flow between the reservoirs, and a heat exchanger for a motor vehicle, especially a micro-channel cooler, produced by such method.

It would be desirable and advantageous to provide an improved method for manufacturing a heat exchanger with a significantly improved performance and higher cooling capacity. It would also be desirable and advantageous to provide a heat exchanger with improved performance and enhanced cooling capacity.

SUMMARY OF THE INVENTION

According to one aspect of the present invention, in a method for producing a heat exchanger for a motor vehicle, the heat exchanger includes a reservoir and bundle of flow-through fluid conduits for guiding a flow between the reservoirs, wherein the conduits are commonly produced as a bundle.

According to another aspect of the invention, a heat exchanger for a motor vehicle can be produced with the aforedescribed method, in particular for use in a micro-channel cooler. The heat exchanger may be formed as a cross-flow, co-flow or counter-flow heat exchanger. Heat dissipation can be thereby be optimally configured depending on the application site. Primary-water and low-temperature-loop coolers can be integrated in the heat exchanger by separating different regions of the heat exchanger to save space.

Thermal energy can be transferred in the heat exchanger from one medium to another medium. Both media may here be a gas, or one medium may be a gas and the other medium a liquid. Energy may also be transferred in the heat exchanger from a gaseous medium to a medium which is a gas or a liquid at a phase transition. Furthermore, both media flowing in the heat exchanger may be liquid.

The two media can flow past each other in the heat exchanger so that heat is transferred between the media. In this case, one medium may be heated or cooled by the other medium. The media may be routed in the conduits guiding the flow side-by-side in opposite directions (counterflow) between the reservoirs. In the conduits guiding the flow, the media may be guided along each other between the reservoirs in the same direction (co-flow). In the conduits guiding the flow, the media may be guided along each other between the reservoirs in a cross-flow pattern. The temperatures of the two media may thus be equalized and thereafter lie between the respective initial temperatures of the different media.

By increasing the surface area of the flow-through fluid conduits by arranging conduit bundles, the magnitude of the heat transfer between the media can be significantly increased. The cold medium can thus be strongly heated and the initially hot medium may be cooled as much as possible. The flow-through fluid conduits may be made of metal, enamel, plastic, glass or other materials, for example silicon carbide. Conduits made of copper or aluminum can combine good thermal conductivity with low weight. To increase the durability of the material, conduits made of steel, in particular stainless steel or cast iron may be used. To further increase the surface area of the cooling surfaces in the heat exchanger, fins, ribs or lamellae can be eliminated. Instead, the invention provides a bundle of flow-through fluid conduits for guiding the flow between the reservoirs.

The conduits may include a plurality of thin-walled hollow profiles, such as tubes, with an inner diameter of less than 2 mm, in particular is less than 1 mm. The wall thickness of the conduit may be less than 1 mm, in particular less than 0.5 mm.

The conduit bundle may include a plurality of hollow thin-walled profiles which are arranged in specific patterns, thereby increasing the surface area of the heat exchanger. The conduits may have a round cross-section. The cross section of each individual conduit may be non-circular, polygonal, elliptical, or may have other geometrical shapes. By the producing the conduits in form of a bundle, the conduits can be produced in the standard lengths, with standard diameter and/or standard wall thickness. A standard production process can significantly reduce the manufacturing costs.

With the method according to the invention, the number of conduits within the standard bundle may be matched to the engine size. The manufacturing cost can be reduced and the production time can be shortened. Other subsequent manufacturing steps may be eliminated, thus reducing costs. The conduits in the bundle can be sealed in a single process step, mechanically cleaned, and prepared together for connection to the respective reservoirs. The further treatment of the conduits and the preparation for use in motor vehicles can be made on all conduits in the bundle repeatably and simultaneously. In this way, sequential, time-consuming steps can be eliminated.

The conduits can be manufactured by an extrusion process or by injection molding. In the extrusion process, the conduits can be continuously pressed in form of a bundle from a curable material under pressure out of a shaping die. In an explosive process, the wall thickness, the diameter of the conduit and the length of the conduit can be set as required. The conduits may be prepared by a cold extrusion process under relatively low pressures and at relatively low temperatures and low shear forces. The method can also produce bundles of flow-through fluid conduits as a hot-extrusion process under high pressures and at high temperatures. The conduit bundles may be produced using piston extruders and screw extruders. Conduit bundles having complex shapes may be made from a brittle and/or soft material using the extrusion process.

Conduit bundles can be economically manufactured in a particularly efficient using injection molding. The quality of the mold determines the form and surface structure of the conduit bundle. Injection molding enables the production of precise mass-produced conduit bundles with high accuracy in a short time. The production of conduit bundles by an injection molding process can be economically useful especially for large numbers. Individual conduits of the bundle can be threaded and/or inserted into components having openings.

The heat exchanger may include support plates for the conduits. The support plates can be manufactured by an injection molding together with the conduits and/or connected to the conduits. The support plates can space the conduits in the bundle apart with extreme accuracy. The conduit bundle can be additionally reinforced by at least one support plate. The method enables a tight fit of the backing plate to the individual conduits of the conduit bundle. Additional costly and labor-intensive processing steps subsequent to the introduction of the individual conduits in the openings of the support plate are not required. A subsequent labor-intensive adjustment and positioning of the support plate on the conduit bundle can be omitted.

The conduits can be initially produced with the support plates with arbitrary lengths and subsequently be cut to size. The pipes can be produced at low cost in an automated manufacturing process. The conduit bundle can be produced together with the support plates as a standard component. Depending on the required length of conduits, the produced lengths can be shortened to the required size. The individual conduits can be aligned on the support plates in one production step. The support plates may have devices for anchoring the conduit bundle on the vehicle.

The reservoirs and/or the support plates can be materially connected with the conduits for guiding the flow during or after the production of the conduit bundles. The material connection can be performed depending on the temperature of the medium and/or depending on the type of the material of the conduit by adhesive bonding, soldering, welding and/or molding. The reservoirs, in particular distribution boxes, can be bonded, brazed, welded or molded during or after the production process. The molding can be done directly or indirectly. The material connection may also be accomplished by injection. Depending on the temperature required to manufacture the conduit bundle, the conduits are further connected to the support plates and/or the reservoirs during or only after the manufacture of the conduits.

The conduits may be produced by internal high-pressure forming (hydroforming) of a preformed semi-finished product. The hydroforming process can be used to form metallic hollow profiles into conduit bundles in a closed mold by way of internal pressure. The internal pressure can be introduced into the tool or in the conduits of the bundle, for example, by a water-oil emulsion. Hydroforming offers the greatest possible design freedom in the production of the conduit bundles. The conduit bundle can also be combined during production with the reservoir and/or the support plates.

With this method, additional components can be eliminated, making the production of the conduit bundle very cost-effective. Additional installation and/or welding operations can be eliminated. The hydroforming process is suitable for the production of the conduit bundles, since the process is characterized by high accuracy and repeatability in the production of the components. The semi-finished products can be preformed as standard parts. Hydroforming of the semi-finished product and manufacture of the mold required for the production of the heat exchanger can be performed in a single manufacturing step. Additional joints between conduit bundles and the distribution boxes and/or the reservoirs and/or the support plates can be omitted.

The pipes can be produced together with the reservoirs in the same hydroforming process. This allows a particularly economical and resource-saving production method.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
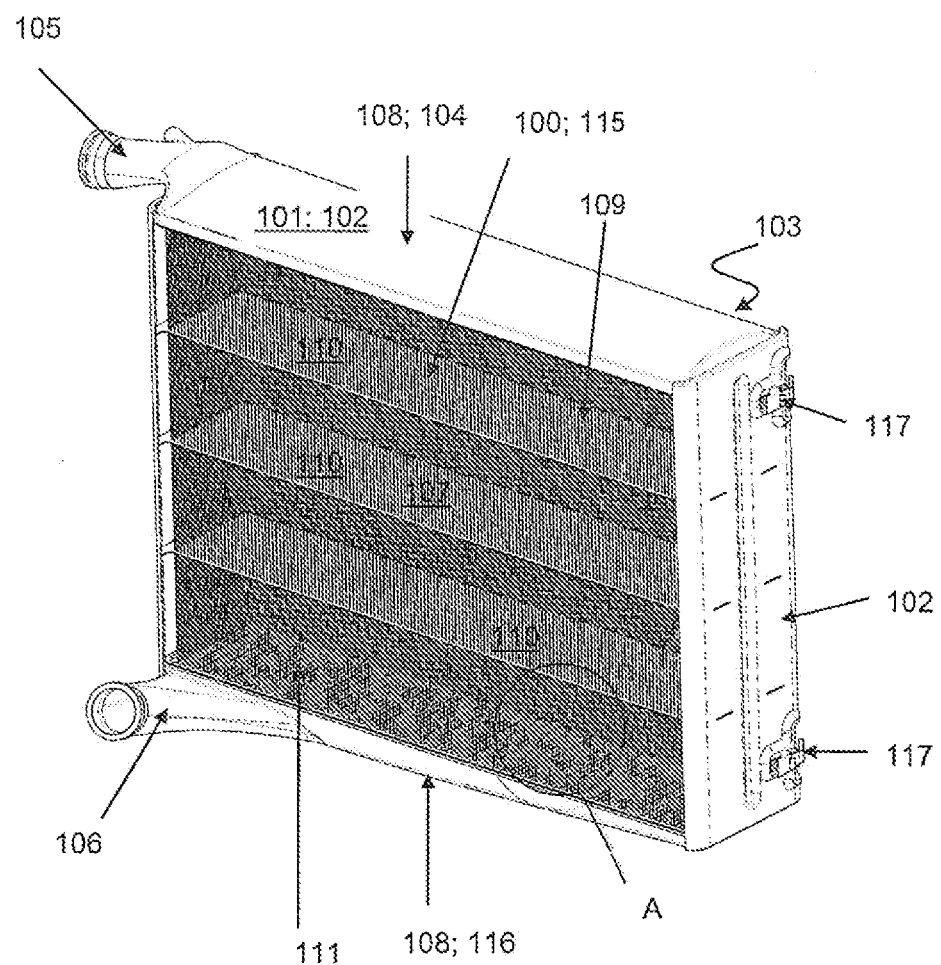
FIG. 1 shows a cooler with a heat exchanger according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom conduits, diagrammatic representations and fragmentary views. In certain instances, details which are not necessary for an understanding of the present invention or which render other details difficult to perceive may have been omitted.

Turning now to the drawing, and in particular to FIG. 1, there is shown a view of the interior of a motor vehicle cooler housing 100, 115 in which a heat exchanger 107 is arranged. The cooler 115 shown in FIG. 1 is designed as a micro-channel cooler 115 and has a plurality of conduits 111 combined in a bundle 109. A housing 101 includes a circumferential side wall 102 and a back 103 and an (unillustrated) cover 104. A flange 105 for connecting a supply conduit for supplying a medium is arranged on the top of the housing 101. A flange 106 for connecting a discharge conduit for discharging a medium is provided on the bottom of the housing 101 on the side of the supply flange 105. Connection devices 117 for attaching the housing 101 to the vehicle are provided on the side wall 102 of the housing 101 opposite the flanges 105, 106. Respective reservoirs 108 for receiving the medium, which communicate with each other through the conduit bundles 109, 111, are arranged on the top and the bottom of the housing 101.

In FIG. 1, three support plates 110 aligned substantially parallel with the reservoirs 108 extend inside the housing 101. The support plates 110 are stacked vertically and affixed to the side walls 102 inside the housing 101. The two reservoirs 108 are interconnected by a bundle 109 of flow-through fluid conduits 111 for guiding the flow.

Figure 2:
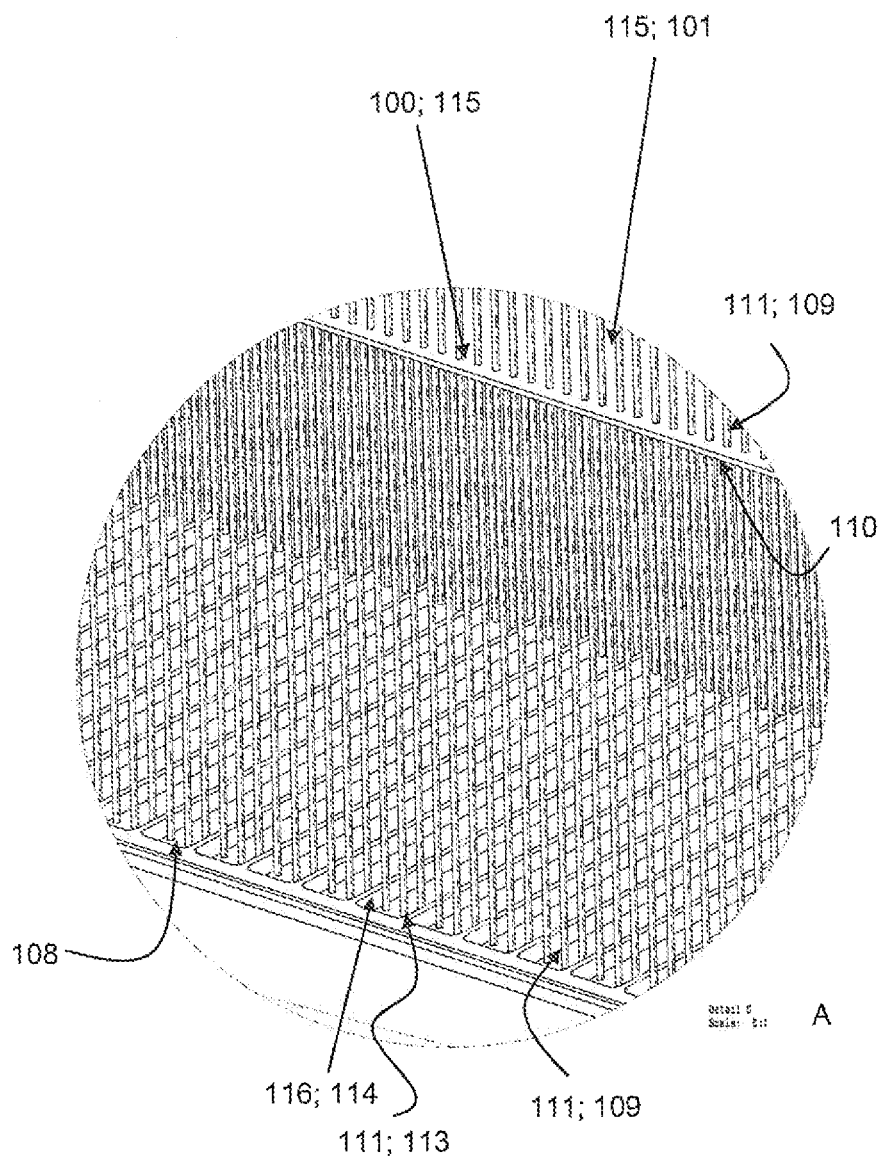
FIG. 2 shows a detail A of the heat exchanger from FIG. 1.

FIG. 2 shows an enlarged detail A of the heat exchanger 107 of the housing interior 101 of the cooler 115, especially a micro-channel cooler 115. The conduits 111 of the bundle 109 extend approximately perpendicular to the support plates 110 and the side walls 102 of the housing 101. The conduits 111 are arranged in spaced-apart parallel rows in the interior of the cooler housing 101, 115. The reservoirs 108 have retracted walls 114 in the region of the cover 104 and a bottom 116 of the housing 101, which each border two rows of conduits 111; 113. The flow-through fluid conduits 111 of the bundle 109 connect the reservoirs 108 and are bordered by the support plates 110 for stabilization.

Figure 3:
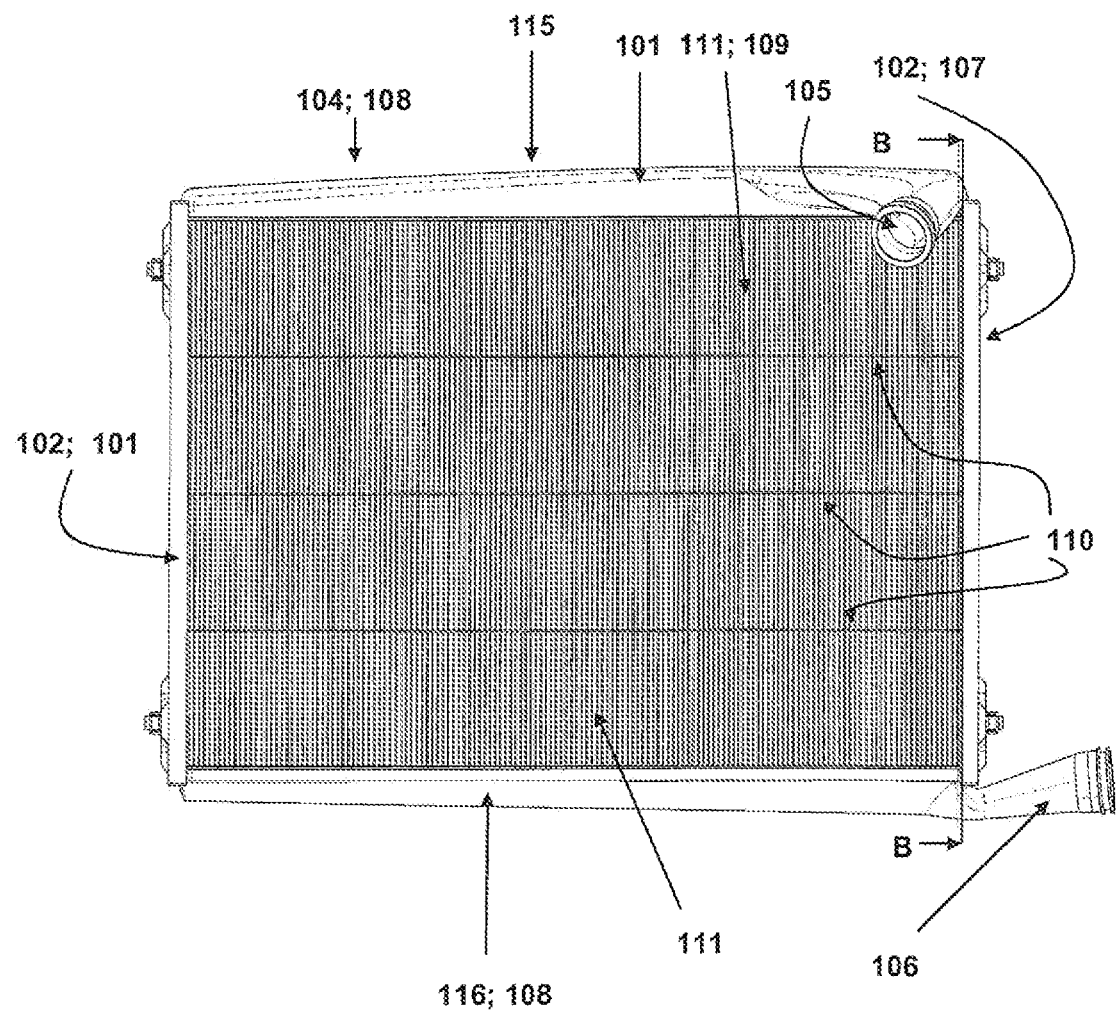
FIG. 3 shows a cooler with a heat exchanger in a front view.

FIG. 3 shows a side view of the micro-channel cooler 115 with the housing 101 and the side walls 102 of the heat exchanger 107. Reservoirs 108 are shown in the region of the cover 104 and the bottom 116. The support plates 110 extend between the side walls 102 of the housing 101 and are pierced by the conduits 111 of the radiator 115. In FIG. 3, the conduits 111 of the bundle 109 connecting the two reservoirs 108 are arranged in parallel rows. A respective supply and discharge flange 105; 106 are each depicted in the region of a housing side wall 101, 102.

Figure 4:
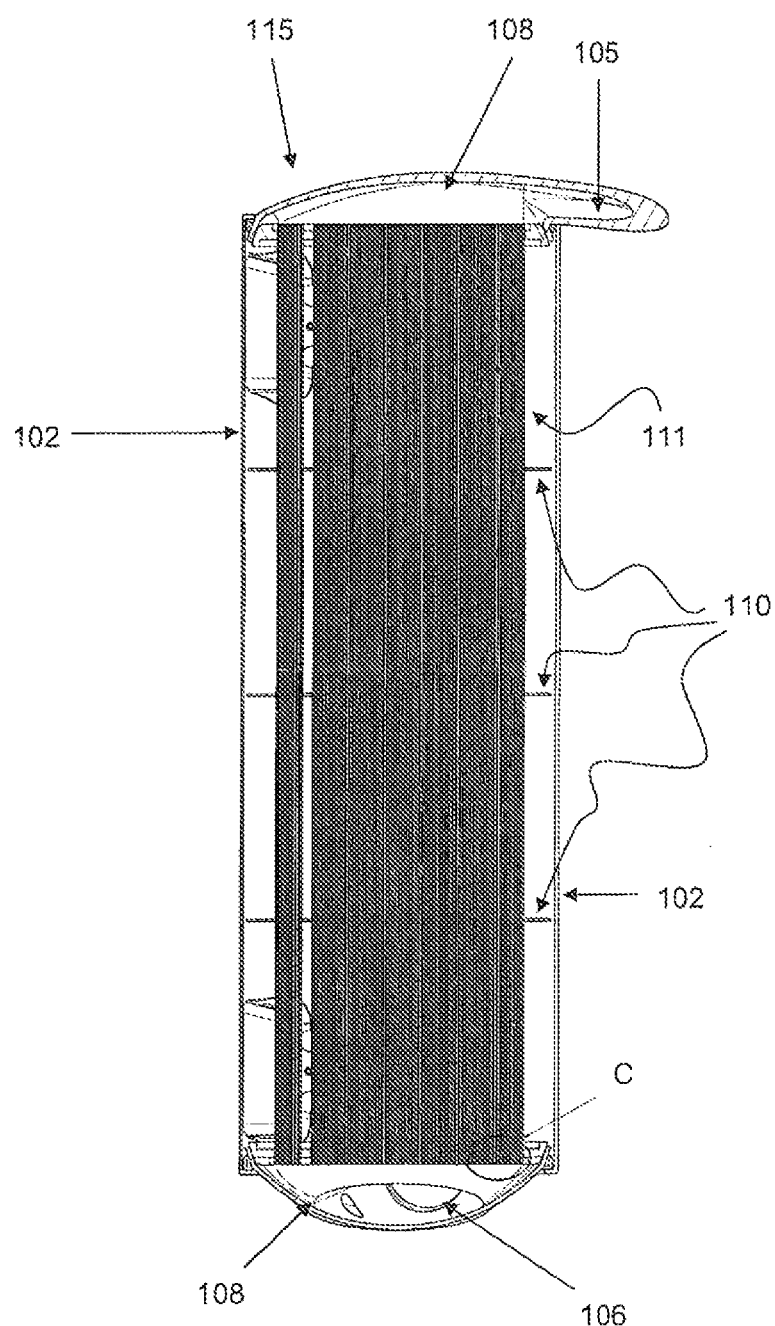
FIG. 4 shows a section B-B through the cooler with heat exchanger according to FIG. 3.

FIG. 4 shows the cooler illustrated in FIG. 3 in a lateral section (B-B). The supply flange 105 shown in a sectional view on the top side in the region of the reservoir 108. Opposite the supply flange 105, on the bottom side of the side wall 102, the discharge flange 106 can be seen in the region of the lower reservoir 108. The conduits 111 extend approximately at right angles to the support plates 110 and connect the two reservoirs 108 for guiding the flow.

Figure 5:
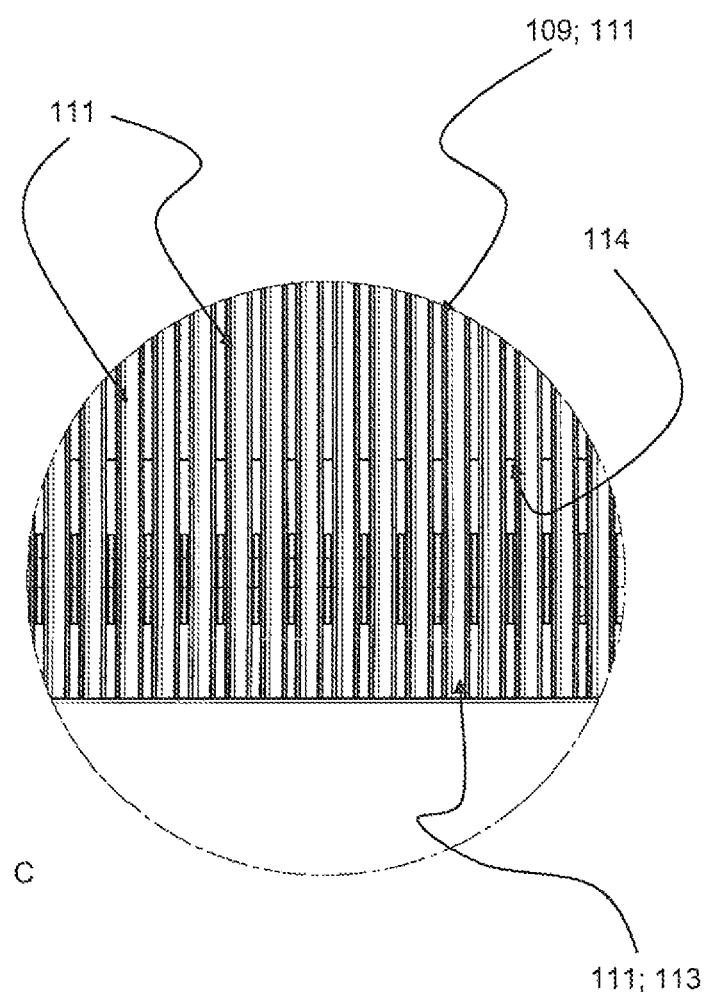
FIG. 5 shows a detailed section C of FIG. 4.

FIG. 5 shows in a detail from FIG. 4 the mutually parallel conduits 111 of the bundle 109, each having two rows of conduits 111, 113 bordered by the walls 114.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for producing a heat exchanger for a motor vehicle comprising:
    providing at least two reservoirs, and
    forming flow-through, individual, separate fluid conduits for guiding fluid flow between the at least two reservoirs, wherein the conduits are formed by an extrusion process that forms the conduits as a bundle of conduits, wherein the bundle of conduits includes the conduits spaced apart in parallel rows allowing air flow between the parallel rows of the conduits, and wherein each of the conduits of the bundle of conduits comprises a separate hollow tube.

2. The method of claim 1, wherein the conduits are initially produced with an arbitrary length and subsequently cut to a desired length.

3. The method of claim 1, wherein the at least two reservoirs are materially connected to the conduits during or after production of the conduits for guiding the fluid flow.

4. The method of claim 1, wherein the heat exchanger is constructed as a micro-channel cooler.

5. The method of claim 1, further comprising supporting the conduits by support plates.

6. The method of claim 5, wherein the conduits with the support plates are initially produced with an arbitrary length and subsequently cut to a desired length.

7. A method for producing a heat exchanger for a motor vehicle comprising:
    providing at least two reservoirs, and
    forming flow-through, individual, separate fluid conduits for guiding fluid flow between the at least two reservoirs, wherein the conduits are formed by an injection molding process that forms the conduits as a bundle of conduits, wherein the bundle of conduits includes the conduits spaced apart in parallel rows allowing air flow between the parallel rows of the conduits, and wherein during the injection molding process support plates are produced together with the conduits using the injection molding process, and the support plates are connected to the conduits.

8. The method of claim 7, wherein the conduits with the support plates are initially produced with an arbitrary length and subsequently cut to a desired length.

9. A method for producing a heat exchanger for a motor vehicle comprising:
    providing at least two reservoirs, and
    forming flow-through, individual, separate fluid conduits for guiding fluid flow between the at least two reservoirs, wherein the conduits are formed by a hydroforming process that forms the conduits as a bundle of conduits, wherein the bundle of conduits includes the conduits spaced apart in parallel rows allowing air flow between the parallel rows of the conduits, and wherein during the hydroforming process the at least two reservoirs are produced together with the conduits using the injection molding process, and the at least two reservoirs are connected to the conduits.

* * * * *